United States Patent
Vuppala et al.

(10) Patent No.: US 10,127,285 B2
(45) Date of Patent: Nov. 13, 2018

(54) CUSTOMIZABLE RANKING OF SEARCH ENGINE RESULTS IN MULTI-TENANT ARCHITECTURE

(71) Applicant: Ariba, Inc., Sunnyvale, CA (US)

(72) Inventors: Raj Vuppala, Dublin, CA (US); Dinesh Shahane, Cupertino, CA (US); Harshad Chavan, Cupertino, CA (US)

(73) Assignee: Ariba, Inc., Sunnyvale, CA (US)

( * ) Notice: Subject to any disclaimer, the term of this patent is extended or adjusted under 35 U.S.C. 154(b) by 453 days.

(21) Appl. No.: 14/806,365

(22) Filed: Jul. 22, 2015

(65) Prior Publication Data
US 2017/0024390 A1   Jan. 26, 2017

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
CPC .......... G06F 17/3053; G06F 17/30867; G06F 17/30321; G06F 17/30345; G06F 19/3456; G06F 19/327; G06F 17/30292; G06F 17/30
See application file for complete search history.

(56) References Cited

U.S. PATENT DOCUMENTS

| | | | | |
|---|---|---|---|---|
| 6,631,365 B1* | 10/2003 | Neal | ................ | G06F 17/30616 707/690 |
| 9,223,897 B1* | 12/2015 | Gross | ................ | G06F 17/30941 707/E17.012 |
| 2003/0195877 A1* | 10/2003 | Ford | ................ | G06F 17/30705 707/E17.108 |
| 2005/0060311 A1* | 3/2005 | Tong | ................ | G06F 17/30864 707/E17.108 |
| 2007/0174138 A1* | 7/2007 | Lee | ................ | G06Q 30/02 705/26.7 |
| 2007/0233671 A1* | 10/2007 | Oztekin | ............ | G06F 17/30867 707/E17.109 |
| 2012/0041846 A1* | 2/2012 | Rehman | ................ | G06Q 30/06 705/27.1 |
| 2014/0344281 A1* | 11/2014 | Rao | ........................ | H04L 67/22 707/741 |
| 2014/0358847 A1* | 12/2014 | Rahurkar | .......... | G06F 17/30345 707/609 |
| 2015/0127624 A1* | 5/2015 | Wintermute | ...... | G06F 17/30342 707/696 |

(Continued)

*Primary Examiner* — Anh Ly
(74) *Attorney, Agent, or Firm* — Schwegman Lundberg & Woessner, P.A.

(57) ABSTRACT

In an example embodiment, a listing of factors to evaluate during calculating of an index score for documents in a database is received, as well as a ranking of each factor in the listing of factors. A relevance multiplication factor is also obtained. Then a document to index in the database is received and the document is indexed. An index score is calculated for the document based on the listing of factors and the ranking of each factor. Then a search query on the database is received. A search score for the document is calculated based on the search query. Then an overall relevance score is calculated for the document for the search query by combining the index score and the search score using the relevance multiplication factor.

20 Claims, 7 Drawing Sheets

(56) References Cited

U.S. PATENT DOCUMENTS

| | | | |
|---|---|---|---|
| 2016/0042080 A1* | 2/2016 | Nguyen | G06F 17/30867 |
| | | | 707/722 |
| 2016/0203061 A1* | 7/2016 | Lee | G06F 11/1469 |
| | | | 714/19 |
| 2016/0203174 A1* | 7/2016 | Shahane | G06F 17/30321 |
| | | | 707/803 |
| 2017/0024390 A1* | 1/2017 | Vuppala | G06F 17/3053 |
| | | | 707/E17.108 |

* cited by examiner

CUSTOMIZABLE RANKING OF SEARCH ENGINE RESULTS IN MULTI-TENANT ARCHITECTURE

TECHNICAL FIELD

This document generally relates to methods and systems for use with computer networks and applications deployed in them. More particularly, this document relates to the customizable ranking of search engine results in a multi-tenant architecture.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally such structured data was stored in dedicated databases. An authorized buyer, for example, would gain viewing access to a supplier's database and thus be able to directly search the products in the database.

Recently there has been increased movement of data to the cloud. In such cloud environments, there is a lot more data (in both quantity and size) to be stored. This can complicate the process of indexing the data in order for it to be efficiently stored, but also creates the problem of efficiently storing such large amounts of data, potentially across multiple tenants. It is common, for example, for tenants to store catalog data in a multi-tenant architecture. It can be difficult, however, for a user to search for catalog data from multiple catalogs simultaneously and obtain relevant results. Different catalogs can have drastically different search result quality when using the same search result ranking criteria.

BRIEF DESCRIPTION OF DRAWINGS

The present disclosure is illustrated by way of example and not limitation in the figures of the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a solution is provided that provides for customizable ranking of search engine results in a multi-tenant architecture. Recognizing that the same search engine result ranking criteria can result in vastly different search result quality for different combinations of multi-tenant catalogs or other data, a solution is provided that allows the blending of a custom ranking formula with a ranking formula built-in to an index core of a multi-tenant architecture. Thus, a user or administrator can not only define custom ranking formulas but also regulate how much weight is applied to the custom ranking formulas versus how much weight is applied to the ranking formula built-in to the index core. This allows a user or administrator to adjust the ranking formula for different combinations of multi-tenant catalogs or other data.

Figure 1:
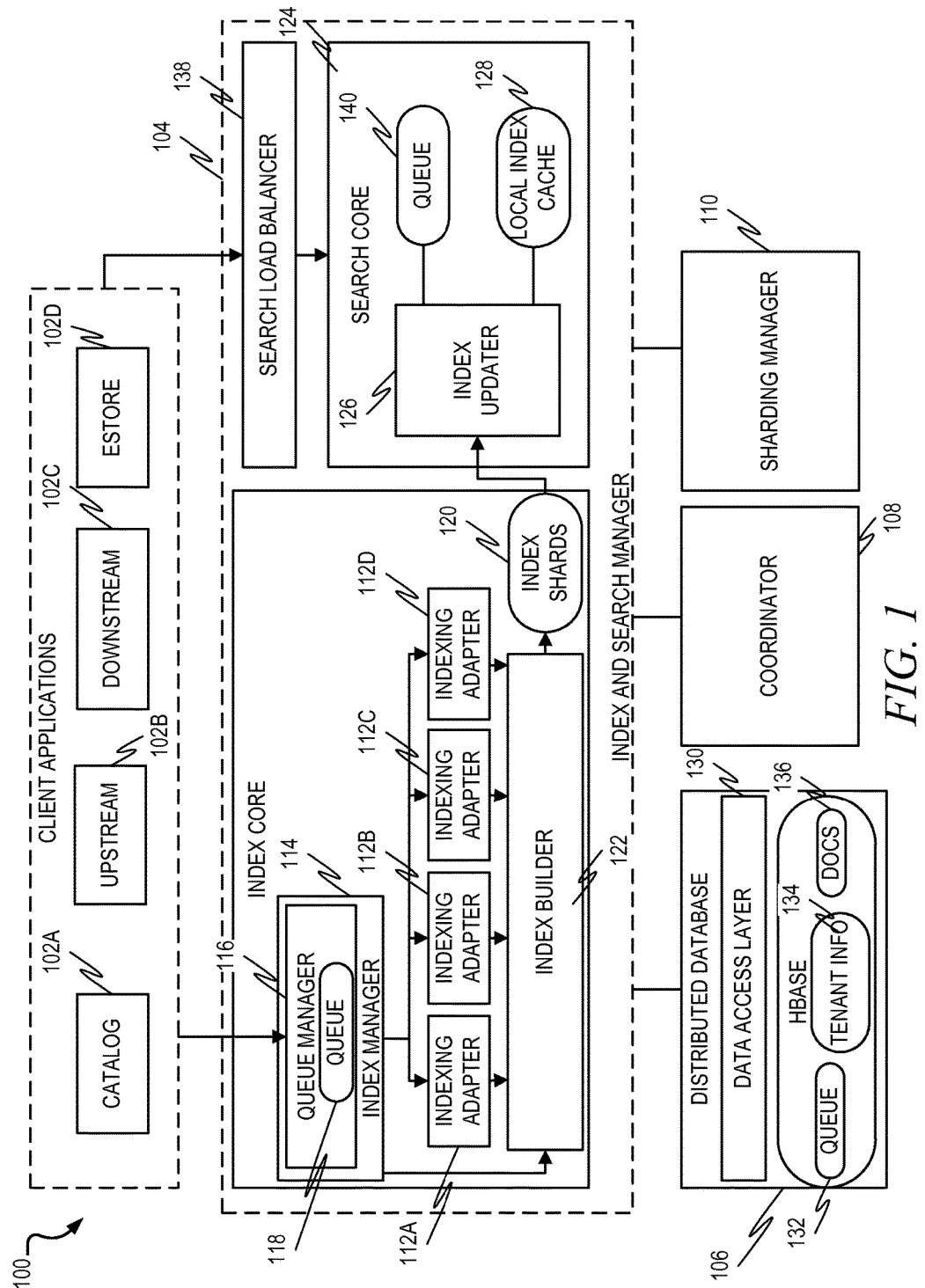
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D, an index and search manager 104, a distributed database 106, a coordinator 108, and a sharding manager 110. Each client application 102A, 102B, 102C, 102D may represent a different application providing data to be indexed and eventually searched by the system 100. A single tenant (e.g., customer such as a company) may provide multiple clients, while other tenants may provide just a single client. In the depicted figure, client application 102A is or includes a catalog application, client application 102B is or includes an upstream application, client application 102C is or includes a downstream application, and client application 102D is or includes an eStore application.

Client applications 102A, 102B, 102C, 102D may provide one or more of three different types of data streams (not pictured). Each data stream may have its own different data with distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, a multi-part collection, or a set of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, client application 102A providing catalog data may utilize indexing adapter 112A, which may include a CIF parser (to parse primary CIF catalog data) and various XM parsers for the auxiliary data, such as kit information, Units of Measure (UOM) map, and the like. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. This may include a queue manager 116 that manages a queue 118 containing incoming data from the client applications 102A, 102B, 102C, 102D, which needs to be indexed. The index manager 114 may act to send data at the front of the queue 118 to the appropriate indexing adapter 112A, 112B, 112C, 112D for the corresponding client while also building a request to an index builder.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the database 106 to allow a scalable computing architecture for building index shards 120. Specifically, the index manager 114 may send a request to build an index to an index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, a shard could include catalog items from a subset of tenants. For large catalogs, a single catalog may span multiple index shards 120.

The distributed database may 106 may contain a data access layer 130, a queue 132, tenant information 134, and documents 136.

The search core 124 may host a Lucene index and answer search queries via search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support search. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents." The document fields, their indexing properties (stored, indexed, etc.), norms, and the like, may be modeled in the bundle providing the local index cache 128. The auxiliary document identifications may be stored in the Lucene document for linking the auxiliary data. The actual auxiliary documents may be stored in the same index as separate documents. For example, a single shard may contain documents relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

The sharding manager 110 may implement the elasticity architecture for distributing the index across search cores 124. In an example embodiment, the sharding manager 110 may receive a HyperText Transfer Protocol (HTTP) request for a search and is aware of which search core 124 can respond to this request. It can then route the request to the specific search core 124, perhaps based at least partially on load balancing if multiple search cores 124 can respond to the request. The search core 124 may then use libraries to parse the queries and launch a search and then respond with matches found in an extensible markup language (XML) document. The XML document may comprise primary data along with the supporting auxiliary data.

In an example embodiment, data from the client applications 102A, 102B, 102C, 102D is indexed to be stored in a multi-tenant, multi-modal, distributed database (e.g., distributed database 106). "Multi-tenant" means that the data from one entity is stored along with the data from another entity, which, as will be seen, makes storage more efficient. "Multimodal" means that data from multiple client applications 102A, 102B, 102C, 102D of a single entity, including data that is parsed using a completely separate indexing adapter 112A, 112B, 112C, 112D, can be stored within that tenant's area of the distributed database 106. The distributed database 106 itself can then be distributed among multiple physical and/or logical servers.

Additionally, as will be discussed in more detail below, the distribution of the distributed database 106 can be dynamically altered so that tenants can be dynamically reassigned to different physical and/or logical servers at any time. This may be based, for example, on need, which may be based on a combination of factors, including data size, data quantity, size of the entity, and frequency of search.

As described briefly above, sharding allows for the segmentation of large amounts of data to be indexed. A segment may also be known as a tenant and represents a parameter for segmenting data. It can map to a platform tenant or some other type of entity. An object class is a search infrastructure used to support the searching of data items. The object class defines the data. It can indicate that the data is, for example, catalog data, requisition data, contract data, and so forth.

In an example embodiment, sharding is driven by four goals: availability, scalability, elasticity, and flexibility. Availability indicates that indexed data should be highly available (e.g., little chance of being unable to access the data at any point in time, even if some storage locations are inaccessible or down). Scalability indicates that the search infrastructure should be able to function well as the size grows, both in terms of index size and in terms of search volume. Elasticity indicates that there is an ability to dynamically assign capacity to tenants to make it easier to plan capacity and achieve better resource utilization. Flexibility indicates that different scalability requirements for different tenants or data classes can be supported.

As described above, the indexing itself may be performed using Lucene indexes. Lucene works by taking documents and fields. A document in Lucene is a class that represents a searchable item. The document is converted into a stream of plain-text tokens. The tokens are then analyzed to make the tokens more friendly for indexing and storage. Then the tokens are stored in an inverted index. Additional details about Lucene indexes are beyond the scope of this disclosure.

Figure 2:
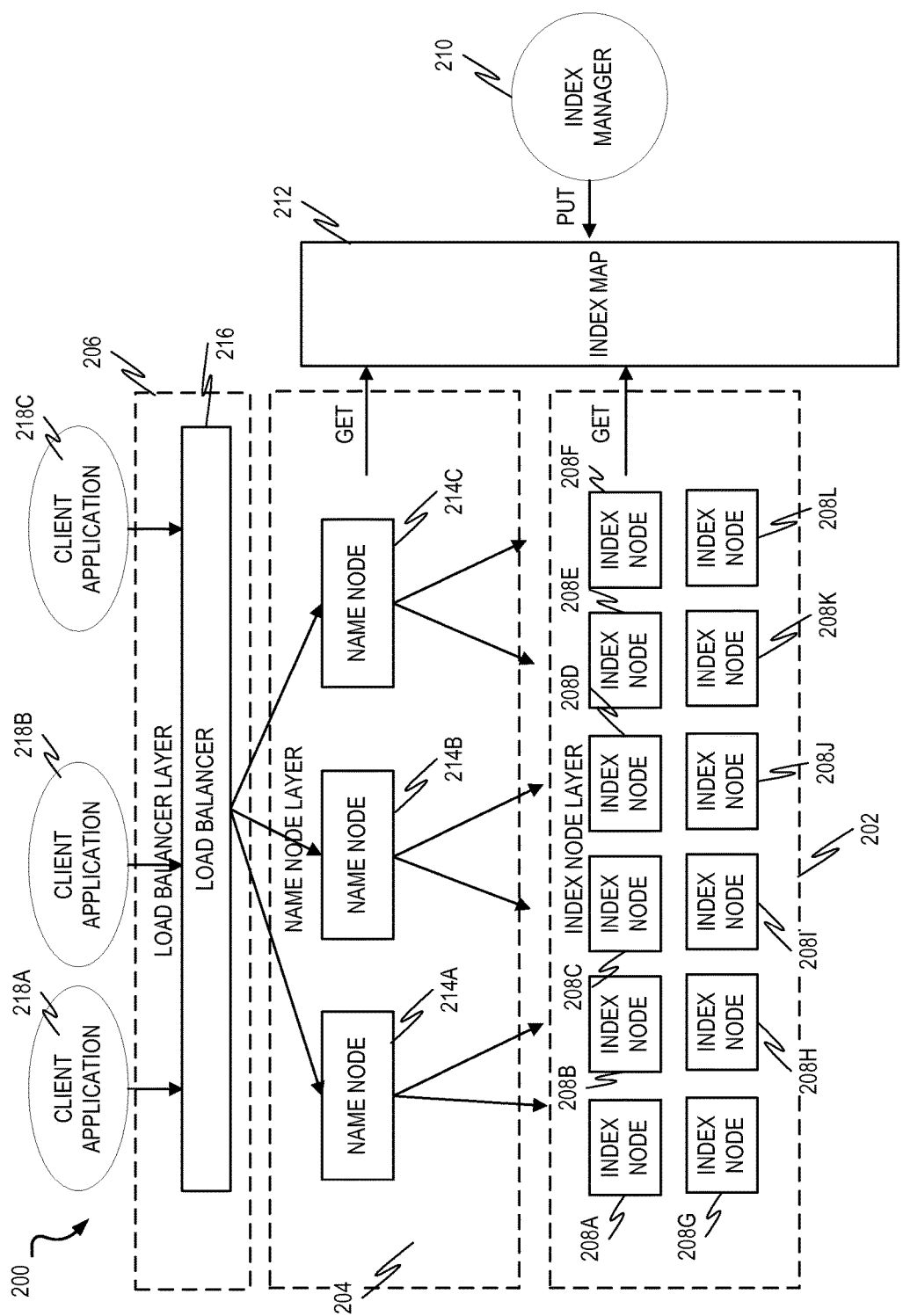
FIG. 2 is a block diagram illustrating a search infrastructure in accordance with an example embodiment.

FIG. 2 is a block diagram illustrating a search infrastructure 200, in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, with each index node 208A-208L comprising a virtual machine. In addition, each index node 208A-208L can be referred to as a shard. Each shard holds a piece of an index (or sometimes the whole index) for a given tenant. Index nodes 208A-208L are responsible for executing searches on the index. It is possible that the entire tenant index fits in a single shard, but the design may assume that the tenant index may need to be distributed across multiple shards. An index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed data node should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name nodes 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client applications 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at runtime). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator in an active-passive type configuration. One of the index manager nodes can be elected as the primary node by the coordinator. The backup index manager nodes can watch the "status" of the primary node and take over if needed. As will be described later, the index manager 210 can be collated with a queue manager. The primary API for the index manager 210 may be based on asynchronous queue-based messaging and, therefore, it makes sense to have the node play a dual role.

In an example embodiment, the index manager node subscribes to one or more tenant queues to receive indexing instructions. This may be the primary interface to the index manager 210. The index manager node may also be connected to the coordinator for watching the current shard configuration information.

Referring back to FIG. 1, in an example embodiment, the index builder 122 may further include functionality to score documents as they are indexed. For simplicity, this score will be referred to herein as an index score. A separate index score may be calculated for each term in the document. The index score may score each term or phrase using information about the document itself. Since in an example embodiment the documents being searched are item data regarding items in one or more catalogs in a multi-tenant database, the search score may use factors regarding the items, such as whether the search term matches an item number of the item, the popularity of the item (measured in a variety of ways, such as how often the item is searched, clicked on, or purchased), whether the item is being sold by a minority owned company, whether the item is a preferred item (as established by, for example, a purchasing manager), and whether the item is being sold by a preferred supplier (as established by, for example, a purchasing manager).

It should be noted that in some multi-dimensional databases fields are indexed rather than files. Thus, in the present disclosure, when the term "document" is used it is used to mean the item that is indexed, whether that be a complete file, or an individual field within a larger file.

In addition to the index score, a search score may be assigned at search time by the search core 124. This search score may be based on metadata regarding each potentially matching document. In an example embodiment, a term or phrase in a document is assigned an index score using the following formula:

$$\text{Search Score} = PMF * (TF/LN) * IDF * QN$$

In this formula, the acronym PMF stands for Phrase Match Factor, which is a score assigned based on the number of search terms within a search phrase that match the document. Thus, if a search phrase has three terms, a document containing all three terms would have a higher PMF score than a document only containing two of those terms. TF stands for term frequency, which is the frequency in which individual terms within the phrase appear in the document. LN stands for length norm, or the normalized length of the document (thus phrases with terms that appear frequently in a small document are given a higher score than phrases with terms that appear at the same frequency but in a larger document). Notably, in an example embodiment, the length norm is not part of the search score calculation in order to avoid penalizing items with longer descriptions. IDF stands for Inverse Document Frequency, which is a measure of a phrase's importance, typically by using the formula: IDF=log (N/DF), where N is the number of overall documents and DF is the document frequency (the number of documents in which the phrase appears). QN stands for query normalization, which is a fixed number for a query that is applied to normalize all of the scores. For example, if there are two matches between an equal number of documents from both of two servers, search results from server 2 should not be penalized just because server 2 has more documents matching. So QN normalizes across the distributed index.

Other factors that may be used in generating the index score may include prefix match, fuzzy match, index time boosting, and query time boosting.

In an example embodiment, the index score may be combined with the search score to provide an overall relevance score in a customized way, rather than merely combining the search score 50-50 with the index score. Specifically, the user may be permitted to provide a relevance multiplication factor. This relevance multiplication factor is a weight (out of, for example, 100) that is then applied to the index score. Thus, if the user wishes for the overall relevance score to be comprised of 70% of the index score and 30% of the search score, the user may provide a relevance multiplication factor of 100. In such an embodiment, the formula for computing the overall relevance score is:

$$\text{overall relevance score} = (x)(\text{index score}) + (100-x)(\text{search score}), \text{ where } x \text{ is the relevance multiplication factor.}$$

Figure 3:
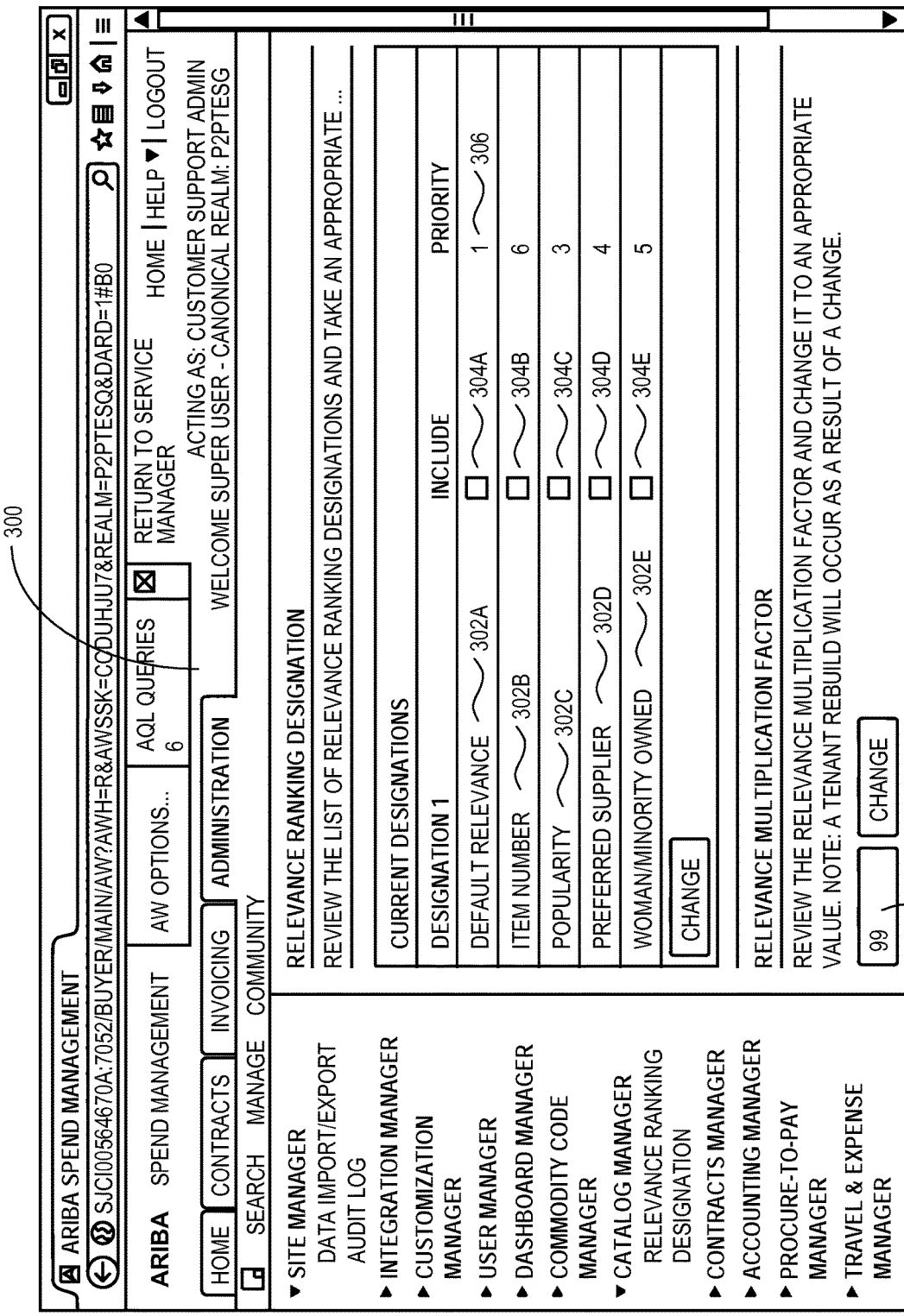
FIG. 3 is a screen capture of a user interface, in accordance with an example embodiment, for specifying a relevance multiplication factor.

FIG. 3 is a screen capture of a user interface 300, in accordance with an example embodiment, for specifying a relevance multiplication factor. In the user interface 300, a user is able to specify whether or not to include certain factors 302A-302E in the index score. Notably, factor 302A corresponds to a "default relevance," which is a default relevance score assigned for the document (perhaps by the manufacturer). Other factors include item number 302B, popularity 302C, preferred supplier 302D, and woman/minority owned 302E. The user may check or uncheck corresponding checkboxes 304A-304E to indicate whether or not the factor is to be included. The user may also specify a priority 306 for each factor. This allows the user to designate individual weighting for each included factor. A text box 308 is also provided to allow the user to specify the relevance multiplication factor (out of 100).

Figure 4:
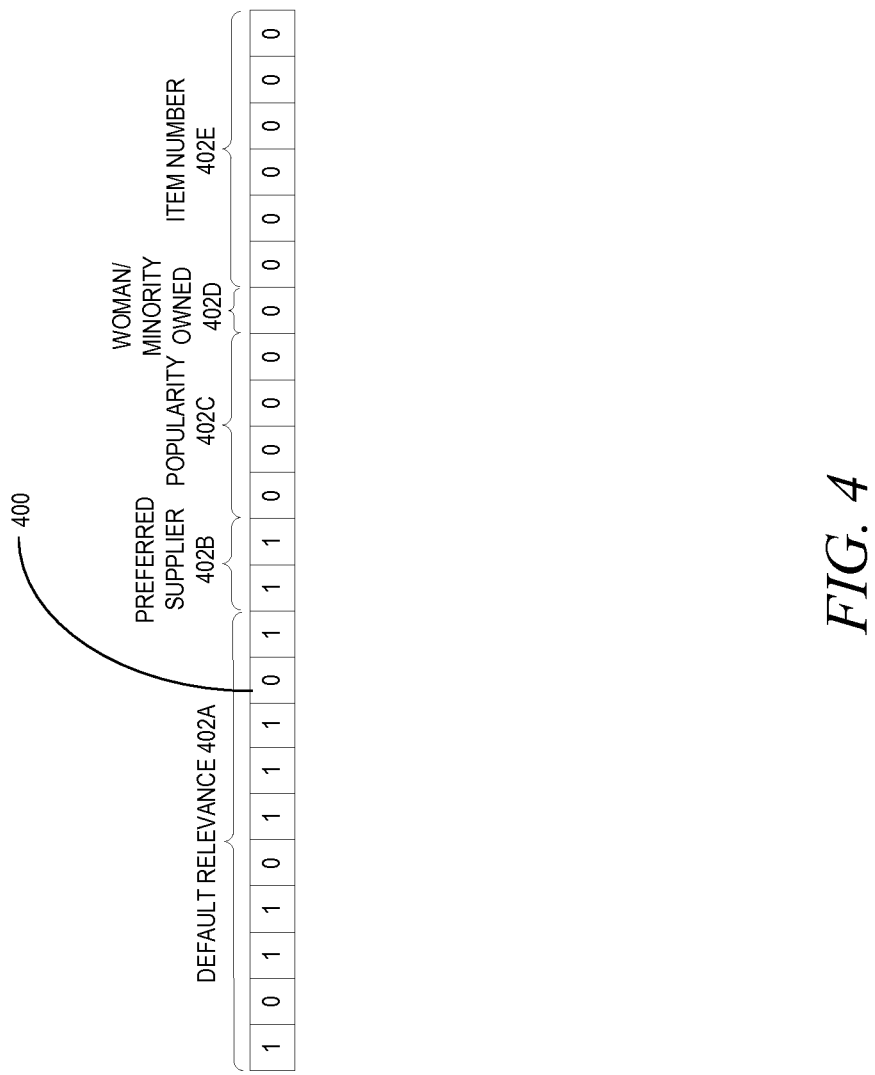
FIG. 4 is a diagram illustrating an array, also known as a bitmap, in accordance with an example embodiment, holding an index score.

In an example embodiment, weighting and priority in the index score may be established by placing the various factors 302A-302E in specific bits of an array or similar data structure. Reading the bits in the array in the order presented then provides a search score. FIG. 4 is a diagram illustrating an array 400, also known as a bitmap, in accordance with an example embodiment, holding an index score. Here, the user has specified the factors and priorities shown in FIG. 3. The various factors 402A-402E are represented in the array 400 in the order specified in the "order" fields in FIG. 3. If the user has elected not to include a particular factor 402A-402E by unchecking the "include" checkbox corresponding to it in FIG. 3, then the corresponding factor 402A-402E may be populated with all zeros for every record/item, as can be seen here with factors 402C-402E. The array then includes a 10-bit default relevance score 402A. This default relevance score is a number assigned to each item in the imported catalog. It can be provided by the supplier (although it can be overridden by the buyer as with all the other factors by electing not to check the "include" checkbox). A 2-bit preferred score 402B (indicated a range of preferred suppliers, namely gold, silver, platinum, or none, assigned as 3, 2, 1, or 0, respective) and a 4-bit popularity score 402C (namely, how many times the item was added to a shopping cart) are then provided. A 1-bit woman/minority owned score 402D is provided, followed by a 6-bit item number 402E. Note that if the user had specified a different priority ranking for the factors 302A-302E using priority 306 in FIG. 3, then the ordering of the factors 402A-402E in the array 400 would be rearranged to correspond to the different priorities.

Figure 5:
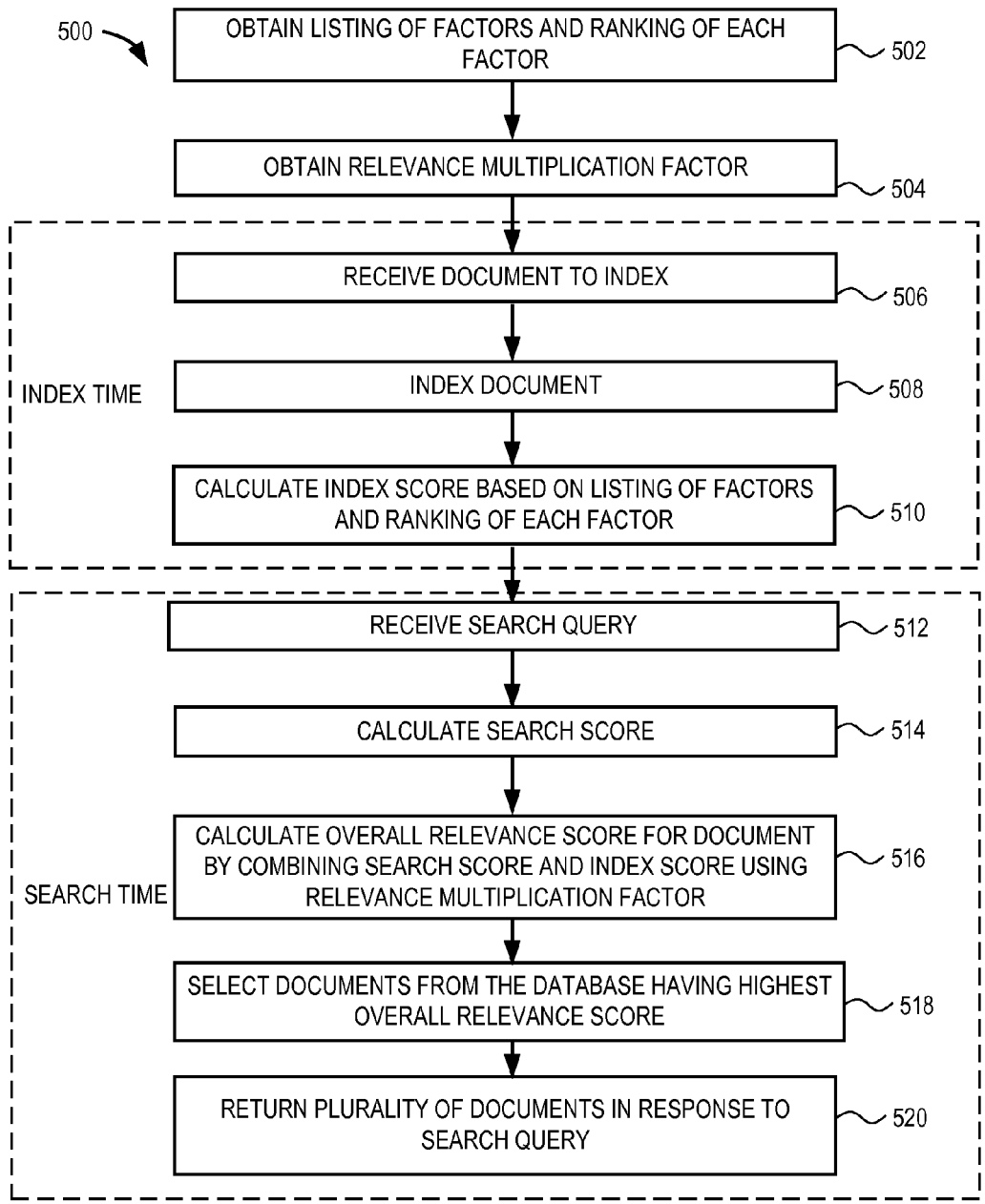
FIG. 5 is a flow diagram illustrating a method, in accordance with an example embodiment, of returning search results from a multi-tenant database.

FIG. 5 is a flow diagram illustrating a method 500, in accordance with an example embodiment, of returning search results from a multi-tenant database. At operation 502, a listing of factors to evaluate during calculating of an index score for documents in a database is obtained, as well as a ranking of each factor in the listing of factors. At operation 504, a relevance multiplication factor is obtained. At operation 506, a document to index in the database is received. At operation 508, the document is indexed in the database. At operation 510, an index score for the document is calculated based on a listing of factors and the ranking of each factor.

At operation 512, a search query on the database is received. At operation 514, a search score is calculated for the document based on the search query and the document. At operation 516, an overall relevance score for the document is calculated for the search query by combining the index score and the search score using the relevance multiplication factor. At operation 518, a plurality of documents from the database that have the highest overall relevance score are selected based on the search query. At operation 520, the plurality of documents are returned from the database in response to the search query.

Example Mobile Device

Figure 6:
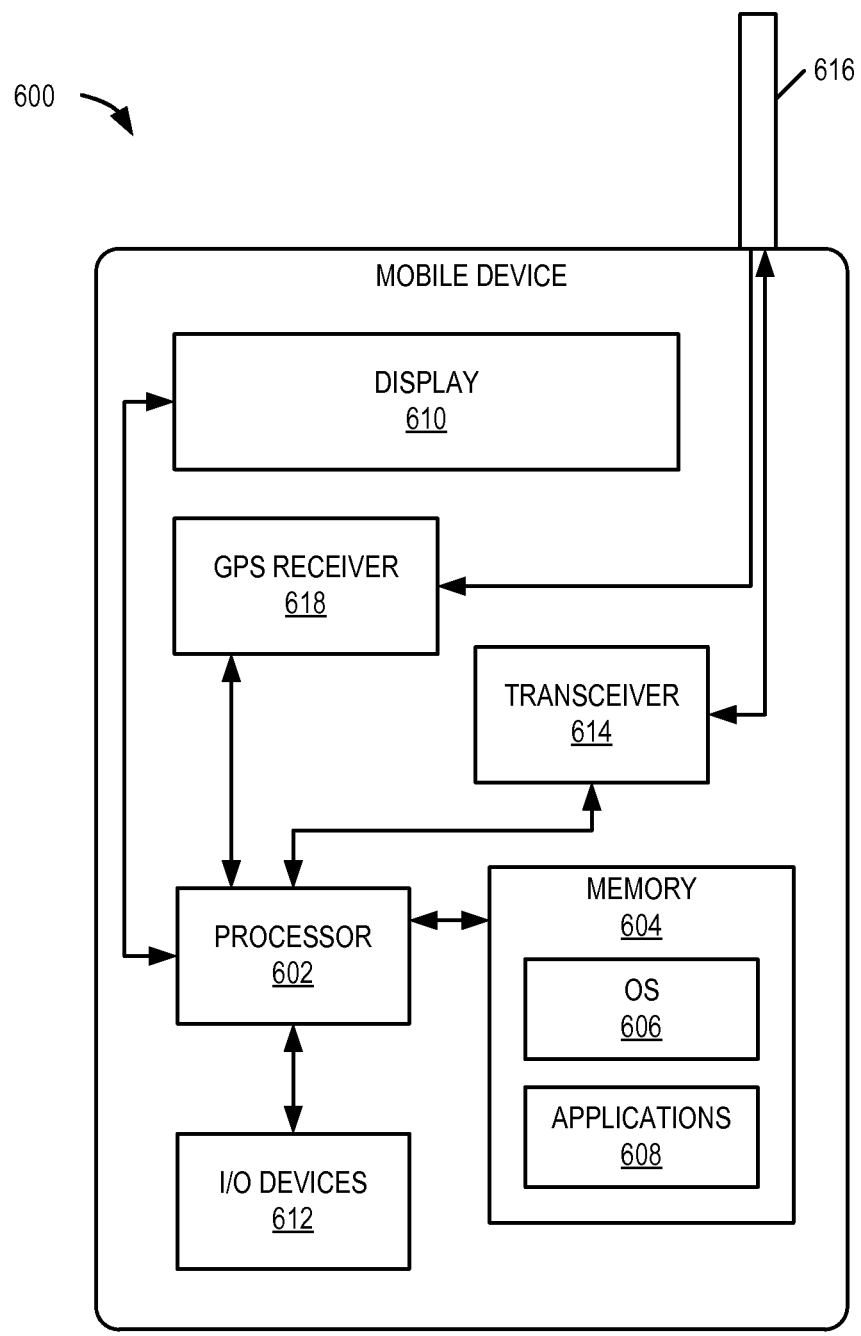
FIG. 6 is a block diagram illustrating a mobile device, according to an example embodiment.

FIG. 6 is a block diagram illustrating a mobile device 600, according to an example embodiment. The mobile device 600 may include a processor 602. The processor 602 may be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 may be adapted to store an operating system (OS) 606, as well as application programs 608, such as a mobile location enabled application that may provide location-based services to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a Global Positioning System (GPS) receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors (e.g., processor 602) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 602 or another programmable processor 602) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 602 configured using software, the general-purpose processor 602 may be configured as respective different hardware-implemented modules at different times. Software may accordingly configure a processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine, but deployed across a number of machines. In some example embodiments, the processor or processors 602 may be located in a single location (e.g., within a home environment, an office environment, or a server farm), while in other embodiments, the processors 602 may be distributed across a number of locations.

The one or more processors 602 may also operate to support performance of the relevant operations in a "cloud computing" environment or as a "software as a service" (SaaS). For example, at least some of the operations may be performed by a group of computers (as examples of machines including processors 602), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 602 executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 602), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
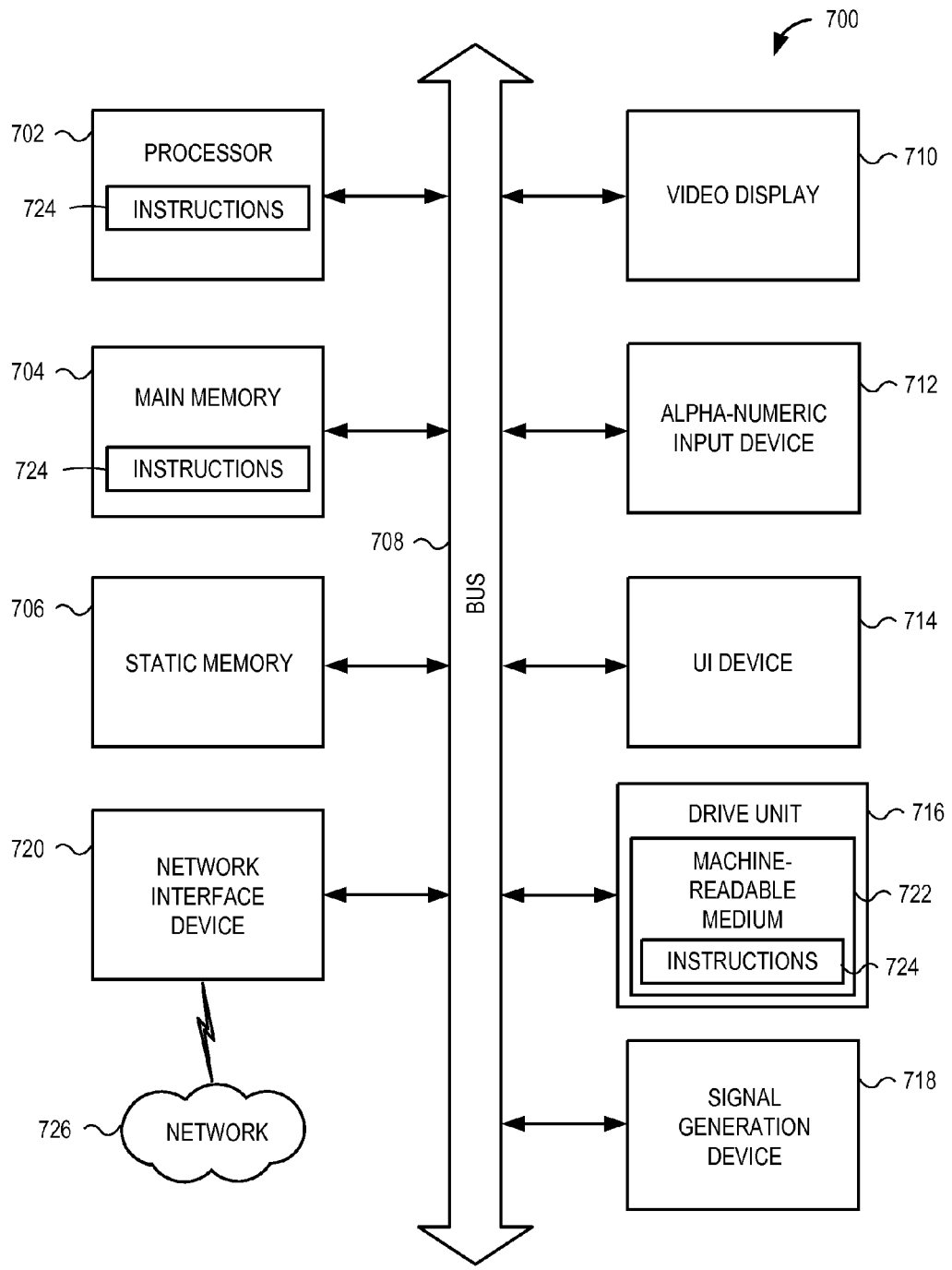
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions 724 (sequential or otherwise) that specify actions to be taken by that machine. Further, while only a single machine is illustrated, the term "machine" shall also be taken to include any collection of machines that individually or jointly execute a set (or multiple sets) of instructions 724 to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown, in an example embodiment, to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying the instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communication network 726 using a transmission medium. The instructions 724 may be transmitted using the network interface device 720 and any one of a number of well-known transfer protocols (e.g., HTTP). Examples of communication networks 726 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    obtaining a listing of factors to evaluate during calculating of an index score for documents in a database, as well as a ranking of each factor in the listing of factors;
    obtaining a relevance multiplication factor;
    receiving a document to index in the database;
    indexing the document in the database;
    calculating, by a hardware processor, an index score for the document as the document is being indexed in the database, the index score based on the listing of factors and the ranking of each factor and generated based on a ranking formula built-into an index core of a multi-tenant architecture;
    receiving a search query on the database;
    calculating a search score for the document based on the search query and a custom ranking formula, in response to the receiving the search query;
    calculating an overall relevance score for the document for the search query by blending the index score and the search score using the relevance multiplication factor;
    selecting a plurality of documents from the database that have a highest overall relevance score based on the search query; and
    returning the selected plurality of documents from the database in response to the search query.

2. The method of claim 1, wherein the listing of factors includes popularity.

3. The method of claim 1, wherein the database is a multi-tenant database.

4. The method of claim 1, wherein the listing of factors includes only factors that can be evaluated based on the document itself and its metadata.

5. The method of claim 1, wherein the index score is calculated at index time whereas the search score is calculated at search time.

6. The method of claim 1, wherein the relevance multiplication factor is represented as a number between 1 and 100 and the overall relevance score is calculated using the formula:

$$\text{overall relevance score} = (x)(\text{index score}) + (100-x)(\text{search score}),$$
where $x$ is the relevance multiplication factor.

7. The method of claim 1, wherein each document represents an item in a catalog.

8. A system comprising:
    an indexing core executable on one or more processors, the indexing core configured to:
        obtain a listing of factors to evaluate during calculating of an index score for documents in a database, as well as a ranking of each factor in the listing of factors;
        receive a document to index in the database;
        index the document in the database;
        calculate an index score for the document as the document is being indexed in the database, the index score based on the listing of factors and the ranking of each factor and generated based on a ranking formula built-into an index core of a multi-tenant architecture; and
    a search core configured to:
        obtain a relevance multiplication factor;
        receive a search query on the database;
        select a plurality of documents from the database that have a highest overall relevance score based on the search query; and
        return the selected plurality of documents from the database in response to the search query.

9. The system of claim 8, wherein the listing of factors includes popularity.

10. The system of claim 8, wherein the database is a multi-tenant database.

11. The system of claim 8, wherein the listing of factors includes that can be evaluated based on the document itself and its metadata.

12. The system of claim 8, wherein the index score is calculated at index time whereas the search score is calculated at search time.

13. The method of claim 8, wherein the relevance multiplication factor is represented as a number between 1 and 100 and the overall relevance score is calculated using the formula:

$$\text{overall relevance score} = (x)(\text{index score}) + (100-x)(\text{search score}),$$
where $x$ is the relevance multiplication factor.

14. A non-transitory machine-readable storage medium comprising instructions which, when implemented by one or more machines, cause the one or more machines to perform operations comprising:
    obtaining a listing of factors to evaluate during calculating of an index score for documents in a database, as well as a ranking of each factor in the listing of factors;
    obtaining a relevance multiplication factor;
    receiving a document to index in the database;
    indexing the document in the database;
    calculating an index score for the document as the document is being indexed in the database, the index score based on the listing of factors and the ranking of each factor and generated based on a ranking formula built-into an index core of a multi-tenant architecture;
    receiving a search query on the database;
    calculating a search score for the document based on the search query and a custom ranking formula, in response to the receiving the search query;
    calculating an overall relevance score for the document for the search query by blending the index score and the search score using the relevance multiplication factor;
    selecting a plurality of documents from the database that have a highest overall relevance score based on the search query; and
    returning the selected plurality of documents from the database in response to the search query.

15. The non-transitory machine-readable storage medium of claim 14, wherein the listing of factors includes popularity.

16. The non-transitory machine-readable storage medium of claim 14, wherein the database is a multi-tenant database.

17. The non-transitory machine-readable storage medium of claim 14, wherein the listing of factors includes only factors that can be evaluated based on the document itself and its metadata.

18. The non-transitory machine-readable storage medium of claim 14, wherein the index score is calculated at index time whereas the search score is calculated at search time.

19. The non-transitory machine-readable storage medium of claim 14, wherein the relevance multiplication factor is represented as a number between 1 and 100 and the overall relevance score is calculated using the formula:

$$\text{overall relevance score} = (x)(\text{index score}) + (100-x)(\text{search score}),$$ where $x$ is the relevance multiplication factor.

20. The non-transitory machine-readable storage medium of claim 14, wherein each document represents an item in a catalog.

* * * * *